United States Patent
Yamamoto et al.

(10) Patent No.: US 6,772,076 B2
(45) Date of Patent: Aug. 3, 2004

(54) ELECTROMAGNETIC FIELD ANALYSIS METHOD BASED ON FDTD METHOD, MEDIUM REPRESENTATION METHOD IN ELECTROMAGNETIC FIELD ANALYSIS, SIMULATION DEVICE, AND STORAGE MEDIUM

(75) Inventors: Kazuo Yamamoto, 730-523, Gakuen Daiwacho 5-chome, Nara-shi, Nara 630-0041 (JP); Hiroyuki Iki, Tokyo (JP)

(73) Assignees: FFC Limited, Tokyo (JP); Kazuo Yamamoto, Nara (JP)

( * ) Notice: Subject to any disclaimer, the term of this patent is extended or adjusted under 35 U.S.C. 154(b) by 39 days.

(21) Appl. No.: 10/156,874

(22) Filed: May 29, 2002

(65) Prior Publication Data

US 2003/0204343 A1 Oct. 30, 2003

(30) Foreign Application Priority Data

Apr. 24, 2002 (JP) ....................................... 2002-123024

(51) Int. Cl.[7] .............................................. G06F 17/11
(52) U.S. Cl. .......................... 702/65; 702/183; 702/188
(58) Field of Search .......................... 702/65, 183, 188, 702/38, 69, 70, 71, 73, 74; 324/345; 375/141; 385/30; 703/5; 377/113

(56) References Cited

U.S. PATENT DOCUMENTS 5,904,709 A * 5/1999 Arndt et al. ................. 607/101
6,005,916 A * 12/1999 Johnson et al. ............... 378/87
6,226,599 B1 5/2001 Namiki ......................... 702/57
2003/0003054 A1 * 1/2003 McDonald et al. ......... 424/9.36

OTHER PUBLICATIONS

J. Fang and J. Ren; "A Locally Conformed Finite–Difference Time–Domain Algorithm of Modeling Arbitrary Shape Planar Metal Strips"; *IEE Transactions on Microwave Theory and Techniques*; vol. 41, No. 5; May 1993.

M. Hano; "FDTD (Finite Difference Time Domain) Method"; *IEE Japan*; Mar. 26–29, 2002.

T. Noda and S. Yokoyama; "Development of a General Surge Analysis Program Based on the FDTD Method"; *T. IEE Japan*; Vo. 121–B, No. 5; 2001.

Mitsuo Hano; "FDTD (Finite Difference Time domain) Method"; Chapter 4 and Fig. 4, p. 413.

Taku Noda, Shigeru Yokoyama; "Development of a General Surge Analysis Program Based on the FDTD Method"; Chapter 3 and Fig. 6–9; pp. 639–630.

* cited by examiner

*Primary Examiner*—Marc S. Hoff
(74) *Attorney, Agent, or Firm*—Greer, Burns & Crain, Ltd.

(57) ABSTRACT

A conductor is represented by a line. A plane on which the conductor crosses a plurality of sides in the planes forming a cell is divided by the conductor. In the planes obtained by the division, a plane containing the position in which the magnetic field intensity is obtained is processed as one plane as is, and a plane not containing the position is added to an adjacent plane. On the side crossing the conductor, the two values of the field intensity are defined. That is, the magnetic field intensity is obtained through the integral loop containing the conductor for each of the divided plane processed as one plane, and the plane to which the divided plane not processed as one plane is added.

11 Claims, 11 Drawing Sheets

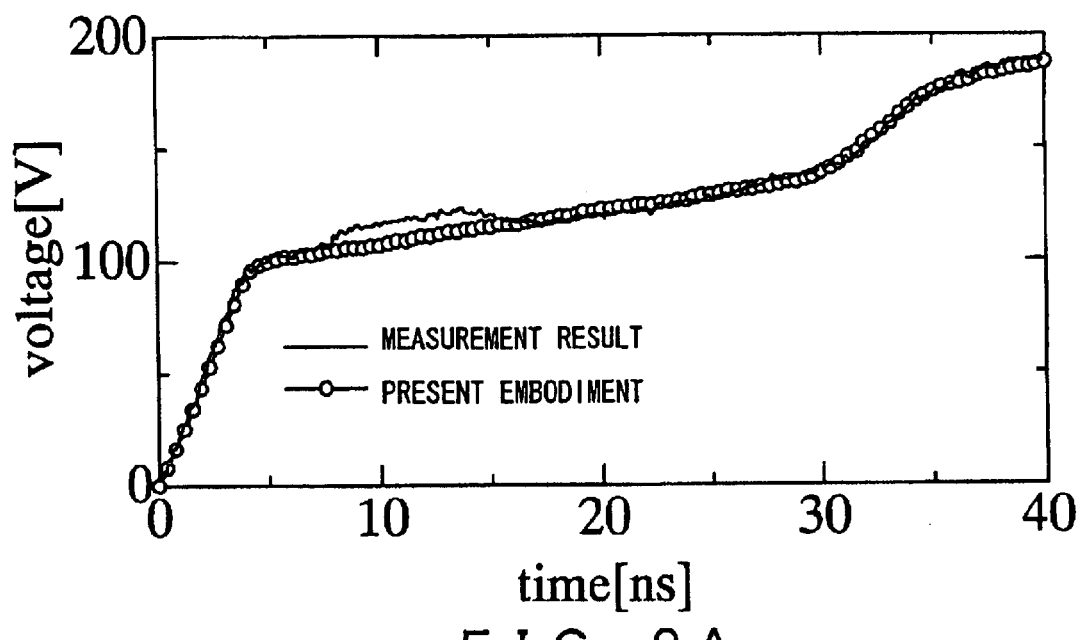
F I G. 9 A
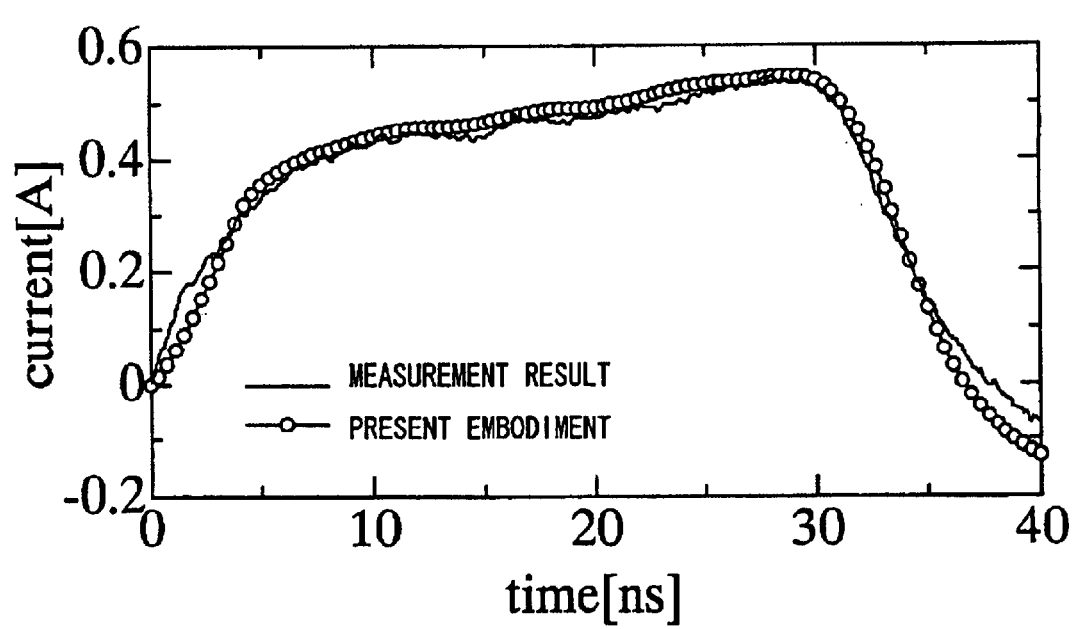
F I G. 9 B

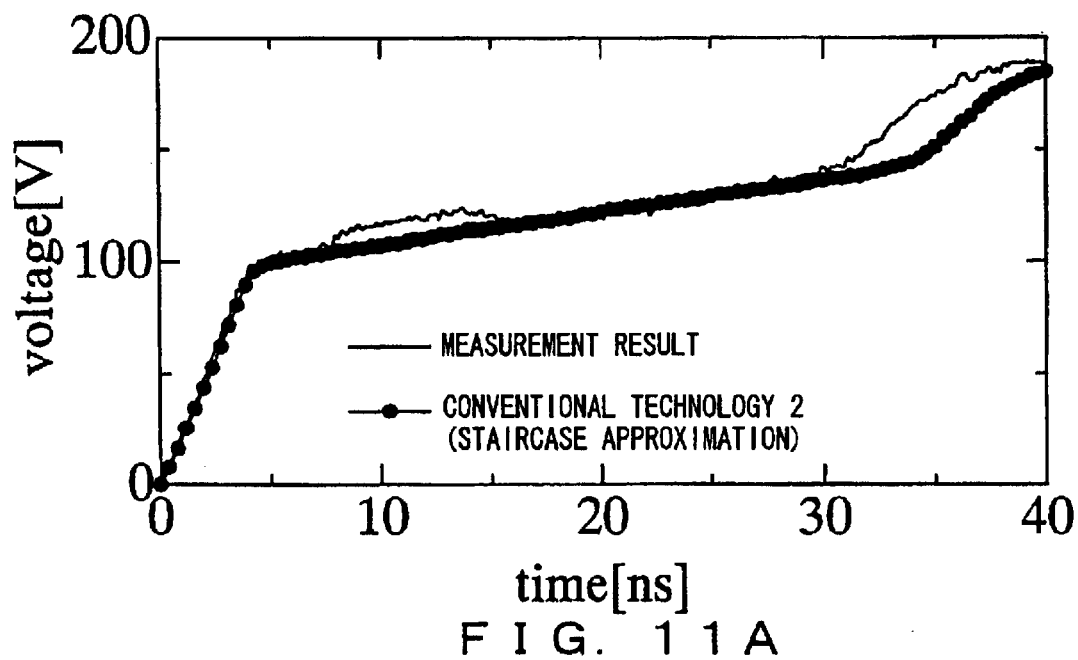
F I G. 1 1 A
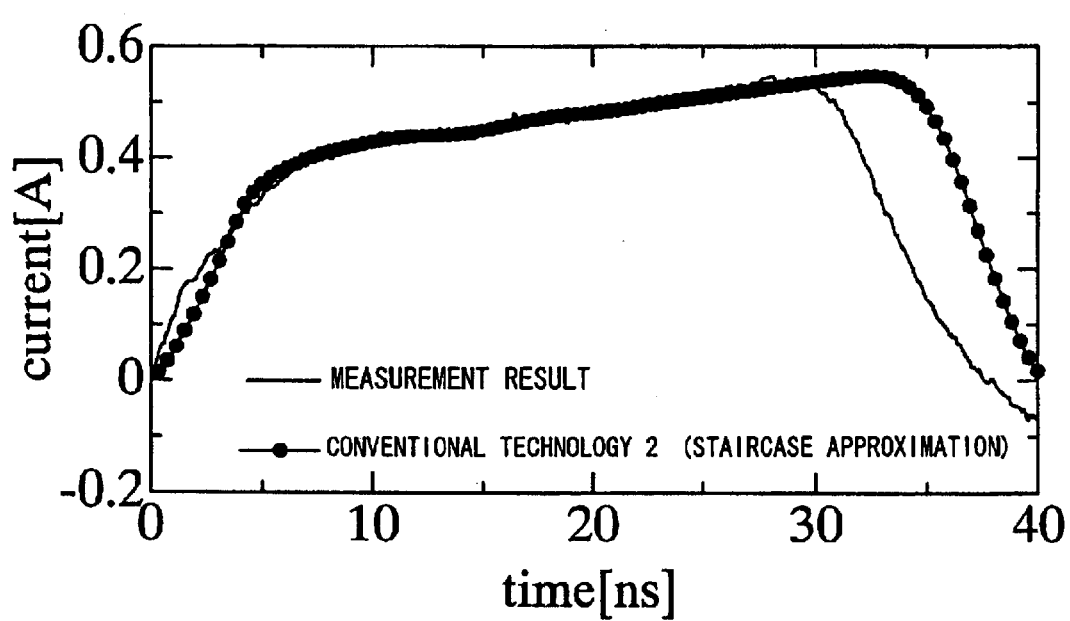
F I G. 1 1 B

ELECTROMAGNETIC FIELD ANALYSIS METHOD BASED ON FDTD METHOD, MEDIUM REPRESENTATION METHOD IN ELECTROMAGNETIC FIELD ANALYSIS, SIMULATION DEVICE, AND STORAGE MEDIUM

BACKGROUND OF THE INVENTION

1. Field of the Invention

The present invention relates to the technology of performing an electromagnetic field analysis based on the FDTD (Finite Difference Time Domain) method by dividing an analyzed space into hexahedral cells.

2. Description of the Related Art

The electromagnetic field analysis is performed in various fields on the antenna problem, the scattering of electromagnetic waves, etc. As analyzing methods, the FEM (Finite Element Method), the moment method, the BEM (Boundary element method), etc. have been used. Recently, the FDTD (Finite Difference Time Domain) method, which is an FDM (Finite Difference Method) suggested by K. S. Yee, has attracted much attention because of a number of advantages such as its simplicity in algorithm, high precision, wide application, etc.

In the FDTD method, an electromagnetic field is differentiated in a time domain and an analyzed space, and the behavior of an electromagnetic field is obtained by a numerical analysis based on the geometric arrangement and shape, and the electric (physical) characteristics such as the conductivity, magnetic permeability, etc. of an object to be analyzed. In a time domain, a discrete transformation is performed in a very short time step ($\Delta t$). An analyzed space is divided into cells for the discrete transformation.

FIG. 1 is an explanatory view of the cell dividing an analyzed space. As shown in FIG. 1, the cell is set as hexahedrons (normally cubes) each having the lengths of $\Delta x$ in the x-axis direction, $\Delta y$ in the y-axis direction, and $\Delta z$ in the z-axis direction. The magnetic field intensity is placed in the center of each plane, and the field intensity is placed in the center of each side. Thus, the field rotation produces a magnetic field, and the magnetic field rotation produces an electric field by differentiating the magnetic field intensity from the field intensity by half-cell spatially shifting them from each other, thereby directly solving the Maxwell's equation. The cell size is set to be less than $\frac{1}{10}$ of the shortest wavelength normally defined as a problem.

The electric field and the magnetic field differentiated by spatially shifted from each other are alternately arranged in a time domain as shown in FIG. 2. That is, the leap-frog algorithm for alternately computing the field intensity and the magnetic field intensity is used. Thus, the magnetic field intensity is obtained from the field intensity, and the field intensity is obtained from the magnetic field intensity, and these processes are alternately performed. The superscripts such as 'n-½', 'n', etc. shown in FIG. 2 represent the positions arranged in the time domain. The difference of the time domain is obtained such that the Courant stability condition can be satisfied.

In the FDTD method, the central difference method is used in differentiating the time domain and the analyzed space using the above mentioned leap-frog algorithm. Depending on the field in which an analysis is performed, the arrangements of the electric field and the magnetic field in a time axis or spatial coordinates can be inverse to each other.

The FDTD method is based on the Maxwell's equation, which is also based on the Ampere's circuital law, and the Faraday's law of induction. Each law is represented in the differentiation form and the integral form, and the above mentioned Maxwell's equation refers to a total of the four equations obtained by combining with the Gauss' law on electric field and magnetic field. The Maxwell's equation in the differentiation form is represented as follows using the field intensity E [V/m], the magnetic field intensity H [A/m], the electric flux density D [C/m$^2$], the magnetic flux density B [T], the electric charge density $\rho$ [C/m$^3$], and the current density J [A/m$^2$].

$$rotH(r, t) = \frac{\partial D(r, t)}{\partial t} + J(r, t) \tag{1}$$

$$rotE(r, t) = \frac{\partial B(r, t)}{\partial t} \tag{2}$$

$$rotB(r, t) = 0 \tag{3}$$

$$rotD(r, t) = \rho(r, t) \tag{4}$$

where the equation (1) (Ampere's law), the equation (2) (Faraday's law of induction), the equation (3) (Gauss' law in the magnetic field), and the equation (4) (Gauss' law in the electric field) are not independent equations. That is, the equations (3) and (4) are at most used as the evaluation references of a numerical error in the FDTD method, and the equations (1) and (2) are used in formulation. If the formulation is performed by applying the central difference method to the time domain and the spatial coordinate using the algorithm of Yee in the equations (1) and (2), then the following FDTD basic equation can be obtained in a 3-dimensional space.

$$E_x^n\left(i+\frac{1}{2}, j, k\right) = K_{1x}\left(i+\frac{1}{2}, j, k\right)E_x^{n-1}\left(i+\frac{1}{2}, j, k\right) + \tag{5}$$
$$K_{2x}\left(i+\frac{1}{2}, j, k\right) \times \left\{\left[H_z^{n-\frac{1}{2}}\left(i+\frac{1}{2}, j+\frac{1}{2}, k\right) - H_z^{n-\frac{1}{2}}\left(i+\frac{1}{2}, j-\frac{1}{2}, k\right)\right]\Delta z - \left[H_y^{n-\frac{1}{2}}\left(i+\frac{1}{2}, j, k+\frac{1}{2}\right) - H_y^{n-\frac{1}{2}}\left(i+\frac{1}{2}, j, k-\frac{1}{2}\right)\right]\Delta y\right\}$$

$$H_x^{n+\frac{1}{2}}\left(i, j+\frac{1}{2}, k+\frac{1}{2}\right) = H_x^{n-\frac{1}{2}}\left(i, j+\frac{1}{2}, k+\frac{1}{2}\right) - \tag{6}$$
$$K_{3x}\left(i, j+\frac{1}{2}, k+\frac{1}{2}\right)\left\{\left[E_z^n\left(i, j+1, k+\frac{1}{2}\right) - E_z^n\left(i, j, k+\frac{1}{2}\right)\right]\Delta z - \left[E_y^n\left(i, j+\frac{1}{2}, k+1\right) - E_y^n\left(i, j+\frac{1}{2}, k\right)\right]\Delta y\right\}$$

$$K_{1x}\left(i+\frac{1}{2}, j, k\right) = \frac{1 - \frac{\sigma\left(i+\frac{1}{2}, j, k\right)\Delta t}{2\varepsilon\left(i+\frac{1}{2}, j, k\right)}}{1 + \frac{\sigma\left(i+\frac{1}{2}, j, k\right)\Delta t}{2\varepsilon\left(i+\frac{1}{2}, j, k\right)}} \tag{7}$$

-continued $$K_{2x}\left(i+\frac{1}{2}, j, k\right) = \frac{\Delta t}{\varepsilon\left(i+\frac{1}{2}, j, k\right)} \frac{1}{\Delta y \Delta z} \quad (8)$$

$$K_{3x}\left(i, j+\frac{1}{2}, k+\frac{1}{2}\right) = \frac{\Delta t}{\mu\left(i, j+\frac{1}{2}, k+\frac{1}{2}\right)} \frac{1}{\Delta y \Delta z} \quad (9)$$

where $\mu$, $\epsilon$, and $\sigma$ respectively indicate the magnetic permeability, permittivity, and electric resistivity.

The characters 'x' and 'y' added as the subscripts to the respective symbols E and H in the equations (5) and (6) indicate the direction of the field intensity and the magnetic field intensity. In these equations, only the field intensity and the magnetic field intensity assigned in the x direction are shown, but they can also be derived in the y and z directions. The documents of the conventional technology to be referred to in understanding the present invention are: 'FDTD (Finite Difference Time Domain) method' by Hano, 2002 National Convention Record IEE Japan, vol. 5, pp 411–414, 2002 (hereinafter referred to as the conventional technology document 1); 'Development of a General Surge Analysis Program Based on the FDTD Method' by Noda and Yokoyama, The Transactions of the Institute of Electrical Engineers of Japan, vol. 121-B, No. 5, pp 625–632, 2001 (hereinafter referred to as the conventional technology document 2); 'A Locally Conformed Finite-Difference Time-Domain Algorithm of Modeling Arbitrary Shape Planar Metal Strips' by J. Fang and J. Ren; IEEE TRANSACTIONS ON MICROWAVE THEORY AND TECHNIQUES, VOL. 41, NO. 5, MAY 1993 (hereinafter referred to as the conventional technology document 3), etc.

The FDTD method is based on the division of an analyzed space by cells as shown in FIG. 1. Therefore, when an object to be analyzed such as a conductor which does not exist in the grid line (side) of the cell, etc. is represented, the shape of the object approximates to the shape of a staircase in the staircase approximation method. However, the shape represented in the staircase approximation method is normally quite different from the actual shape. Therefore, in the conventional analyzing method using the staircase approximation method, there has been the problem that there occurs a large error in the resonance frequency of an object to be analyzed and its propagation time, thereby failing in carrying out an analysis with high precision.

The difference between the shape represented in the staircase approximation method and the actual shape can be reduced by reducing the cell size. However, smaller cells require a larger number of cells, thereby increasing necessary computer resources and requiring a longer computing time. As a result, it is not desired to reduce the cell size even partially. Since a relatively large analyzed space can be processed in the field of a surge analysis, it is particularly not desired.

When the shape of an object to be analyzed is represented by transforming the shape of a cell, the modeling is required depending on the object, thereby lacking the generality. The method of setting the coordinate system such that the object can be in the grid lines normally cannot be used when a plurality of objects exist in an analyzed space at an arbitrary state. Thus, it is significant to more correctly represent and analyze an object to be analyzed existing in an analyzed space without reducing a cell size, transforming the shape of the cell, etc.

SUMMARY OF THE INVENTION

The present invention aims at providing a general-purpose technology for carrying out an electromagnetic field analysis with high precision and reliability by correctly representing an object to be analyzed (medium) existing in an analyzed space.

The electromagnetic field analysis method based on the FDTD method according to the present invention is a method of carrying out an electromagnetic field analysis using the FDTD (Finite Difference Time Domain) method by dividing an analyzed space into hexahedral cells. In this method, a medium selected from among a plurality of media existing in an analyzed space to be divided into cells is set as a line, and a plane in which the line crosses a plurality of sides in the planes forming the cell is divided by the line into plural units, thereby obtaining field intensity or magnetic field intensity.

In the above mentioned division of the plane by the line, it is desired that a section not containing the position in which the magnetic field intensity is computed in a plurality of sections obtained by dividing the plane by the line is included as an adjacent plane, and a section containing the position is not included as an adjacent plane. It is also desired that at least one of the field intensity of the plurality of the sections obtained by dividing the plane by the line as the field intensity having the same direction computed on the periphery of the plane. It is desired that the magnetic field intensity of the plane divided into a plurality of sections by the line is computed using the field intensity obtained using the integral loop including the line. It is also desired that the magnetic field intensity of each plane which is adjacent in the crossing direction to the plane divided by a line into a plurality of sections and has a side crossing the line is computed based on a plurality of adjacent sections. It is desired that each field intensity of the plane divided by a line into a plurality of sections is computed without considering the line, and then one or more of the computed field intensity is to be amended as necessary.

The medium representing method in the electromagnetic field analysis according to the present invention is a method used to represent a medium by the electromagnetic field analysis carried out in the FDTD method by dividing an analyzed space into hexahedron cells. In this method, a medium existing in an analyzed space to be divided into cells is selected, and the selected medium is set and represented as a line crossing a plurality of sides of a plane forming part of a cell.

The simulation device according to the present invention is based on the assumption that an analyzed space is divided into hexahedron cells, and an electromagnetic field analysis is carried out in the FDTD method, and includes a medium setting unit for setting a medium existing in the analyzed space as a line, and an analysis unit for obtaining the field intensity or the magnetic field intensity by dividing a plane crossing a plurality of sides in the planes of the cell obtained by dividing the analyzed space by the line set by the medium setting unit.

In the above mentioned division of the plane by the line, it is desired that a section not containing the position in which the magnetic field intensity is computed in a plurality of sections obtained by dividing the plane by the line is included as an adjacent plane, and a section containing the position is not included as an adjacent plane. In the analysis unit, it is also desired that at least one of the field intensity of the plurality of the sections obtained by dividing the plane by the line as the field intensity having the same direction computed on the periphery of the plane.

The storage medium according to the present invention is computer-readable, and stores a program executed by a computer to realize the simulation device according to the present invention.

According to the present invention, a medium (a conductor, a structure, etc.) selected from the media existing in an analyzed space is set (represented) as a line, and at least one of the field intensity and the magnetic field intensity is obtained after dividing a plane having a plurality of sides crossed by the line in the planes forming a cell.

By obtaining at least one of the field intensity and the magnetic field intensity after dividing the plane by the line into a plurality of sections, the line can be practically processed as arranged on the side of the plane of a cell. Since the line can be arranged on the plane of a cell, high flexibility can be obtained, thereby improving the generality. The medium represented by the line can produce imitation more correctly in shape. Thus, the electromagnetic field analysis can be performed with high precision and generality.

When, in the above mentioned division of the plane by the line, a section not containing the position in which the magnetic field intensity is computed in a plurality of sections obtained by dividing the plane by the line is included as an adjacent plane, and a section containing the position is not included as an adjacent plane, the increase of the number of planes produced by the division can be avoided. As a result, the number of the values of the finally obtained intensity, that is, the amount of data to be stored can be avoided, thereby suppressing the increase of necessary computer resources.

BRIEF DESCRIPTION OF THE DRAWINGS

FIG. 9A shows the analysis result (voltage waveform at the sending end) according to an embodiment of the present invention;

FIG. 9B shows the analysis result (current waveform at the sending end) according to an embodiment of the present invention;

FIG. 11A shows the analysis result (voltage waveform at the sending end) according to the conventional technology 2; and FIG. 11B shows the analysis result (current waveform at the sending end) according to the conventional technology 2.

DESCRIPTION OF THE PREFERRED EMBODIMENTS

The embodiments of the present invention are described below in detail by referring to the attached drawings.

Figures 3A, 3B:
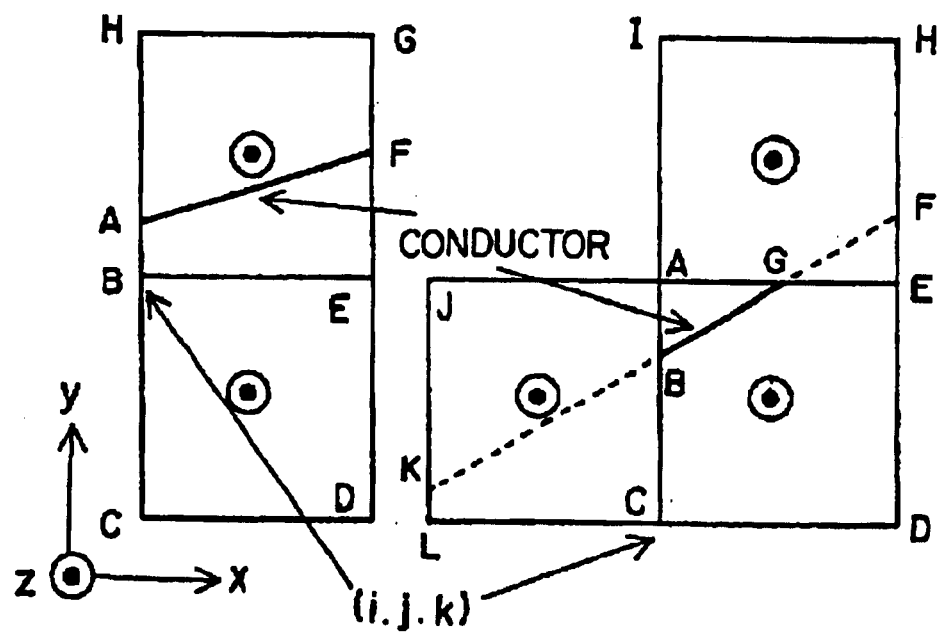
FIG. 3A shows the positional relationship between the plane forming part of a cell and the conductor crossing the two opposite sides of the plane.
FIG. 3B shows the positional relationship between the plane forming part of a cell and the conductor crossing the two opposite sides of the plane.

FIGS. 3A and 3B show the positional relationship between the plane forming part of a cell and the conductor crossing the two sides of the plane. First, the method of representing the conductor (a medium to be distinguished from others) used in the present embodiment, and the approximation method of the magnetic field and the electric field on the periphery of the conductor are described below by referring to FIGS. 3A and 3B.

Figure 1:
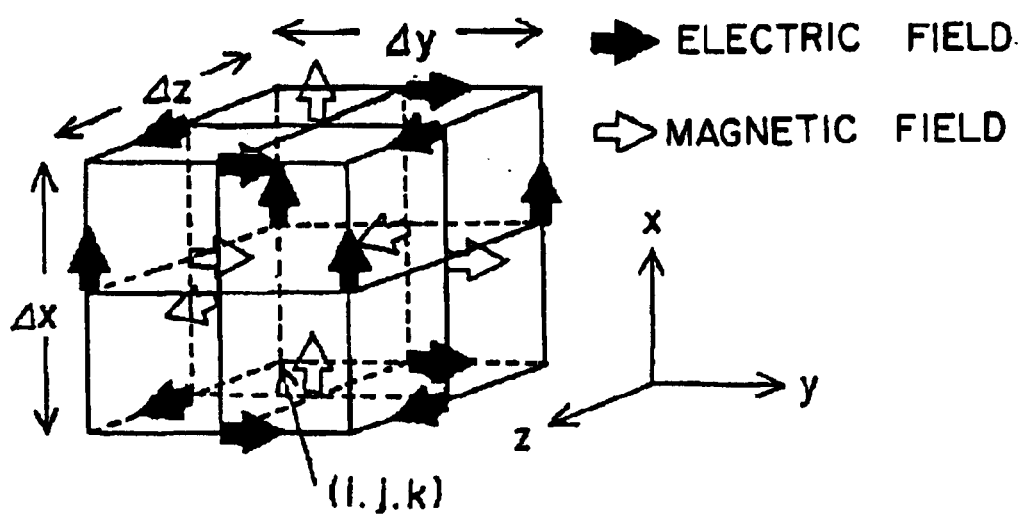
FIG. 1 shows cell obtained by dividing an analyzed space.
Figure 2:
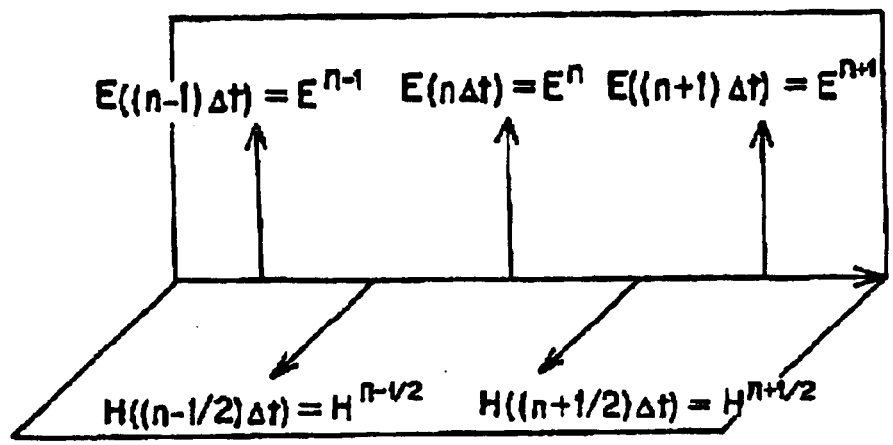
FIG. 2 shows a time arrangement of a electromagnetic field.

According to the present embodiment, an analyzed space is divided into hexahedron cells (FIG. 1) in a common space dividing method, and the shape and the arrangement of the conductor is set individually. Thus, a line imitates the shape of a conductor inclined in an optional position at an optional angle on the plane forming part of a cell. A conductor which cannot be arranged on the grid lines of the cell is imitated by a line on a plane.

When a conductor is imitated by a line, the conductor crossing a side crosses either the opposite side or an adjacent side. FIG. 3A shows the positional relationship in the former case, that is, when the conductor crosses two opposing sides. FIG. 3B shows the positional relationship in the latter case, that is, when the conductor crosses two adjacent sides. In FIG. 3B, the conductors crossing the plane other than the plane ACDE are indicated by dotted lines. The position in which the magnetic field intensity on the plane is indicated by a circle containing a dot.

Conventionally, in the FDTD method, only one electric field is defined for each side. However, according to the present embodiment, two electric fields are defined for a side before and after the point at which a conductor crosses the side. The integral loop of the magnetic field adjacent to the conductor is changed from the integral loop along the side of the plane to the integral loop containing the conductor. Thus, the plane for which the field intensity or the magnetic field intensity is computed is divided by a conductor, and the intensity is computed for each of the divided planes (sections), thereby recognizing the conductor as existing in addition to the grid lines. The approximation method for the magnetic field and the electric field on the periphery of the conductor is practically described below for each case shown in FIGS. 3A and 3B.

In the case shown in FIG. 3A, the conductor crosses the side BH at the point A and the side EG at the point F. Thus, in this case, the side BH is divided into two, that is, the sides AB and AH, and the side EG is divided into two, that is, the sides EF and FG. Then, the field intensity $E_y$ in the y direction in the center is defined. In this example, the field intensity $E_y$ is defined as follows.

$$E_y\left(i, j + \frac{AB}{2\Delta y}, k\right) = E_y\left(i, j - \frac{1}{2}, k\right) \quad (10)$$

$$E_y\left(i, j + 1 - \frac{AH}{2\Delta y}, k\right) = E_y\left(i, j + \frac{3}{2}, k\right)$$

$$E_y\left(i+1, j + \frac{EF}{2\Delta y}, k\right) = E_y\left(i+1, j - \frac{1}{2}, k\right) \quad (11)$$

$$E_y\left(i+1, j + 1 - \frac{FG}{2\Delta y}, k\right) = E_y\left(i+1, j + \frac{3}{2}, k\right)$$

The data in the parentheses in the equations (10) and (11) indicate the coordinate position for definition of the field intensity $E_y$. The symbol '$\Delta y$' indicates the cell size in the y direction. 'AB' indicates the length between the points A and B. The explanation holds true in the other equations.

In the case shown in FIG. 3B, the conductor crosses the side AC at the point B and the side AE at the point G. In this case, the side AC is divided into two parts, that is, the sides AB and BC, and the field intensity $E_y$ in the y direction in the center is similarly defined as follows.

$$E_y\left(i, j + \frac{BC}{2\Delta y}, k\right) = E_y\left(i, j - \frac{1}{2}, k\right) \quad (12)$$

$$E_y\left(i, j + 1 - \frac{AB}{2\Delta y}, k\right) = E_y\left(i, j + \frac{3}{2}, k\right)$$

On the other hand, the field intensity $E_x$ in the x direction assigned in the vicinity of the conductor is computed as follows.

In the case shown in FIG. 3A, since the magnetic field intensity $H_z$ (i+½, j−½, k) computed using the integral loop ABCDEFA and the integral loop BCDEB is to be the same between them, the field intensity $E_x$ (i+½, j, k) is computed by the following equation.

$$E_x\left(i + \frac{1}{2}, j, k\right) = E_y\left(i, j - \frac{1}{2}, k\right) \cdot AB - E_y\left(i+1, j - \frac{1}{2}, k\right) \cdot EF \quad (13)$$

Similarly, in the case shown in FIG. 3B, since the magnetic field intensity $H_z$ (i+½, j+½, k) computed using the integral loop BCDEFGB and the integral loop BCDEGB is to be the same between them, the field intensity $E_x$ (i+1−EG/2$\Delta y$, j+1, k) is computed by the following equation.

$$E_x\left(i + 1 - \frac{EG}{2\Delta x}, j+1, k\right) = -\frac{E_y\left(i+1, j + \frac{1}{2}, k\right) \cdot EF}{EG} \quad (14)$$

The field intensity $E_x$ (i+AG/2$\Delta x$, j+1, k) can also be computed by a similar equation.

As described above in deriving the equations (13) and (14), the magnetic field intensity on the periphery of the conductor is computed after changing the integral loop depending on the conductor. In the case shown in FIG. 3A, the integral loop used in computing the magnetic field intensity $H_z$ (i+½, j−½, k) is assumed to be the integral loop ABCDEFA. Since the field intensity E of the conductor is zero, the magnetic field intensity $H_z$ (i+½, j−½, k) is computed by the following equation.

$$H_z^{n+\frac{1}{2}}\left(i+\frac{1}{2}, j-\frac{1}{2}, k\right) = H_z^{n-\frac{1}{2}}\left(i+\frac{1}{2}, j-\frac{1}{2}, k\right) - \quad (15)$$

$$K_{3z}\left(i+\frac{1}{2}, j-\frac{1}{2}, k\right)\left\{E_x^n\left(i+\frac{1}{2}, j-1, k\right)\Delta x + E_y^n\left(i+1, j-\frac{1}{2}, k\right)\right.$$

$$\left.\left(1 + \frac{EF}{\Delta y}\right)\Delta y - E_y^n\left(i, j-\frac{1}{2}, k\right)\left(1 + \frac{AB}{\Delta y}\right)\Delta y\right\}$$

The plane (section) ABEF forming part of the plane BEGH on which a conductor crosses does not contain the position in which the magnetic field intensity $H_z$ is computed. When the magnetic field intensity $H_z$ is computed on the section ABEF, the number of magnetic field intensity H to be computed and maintained increases by dividing the plane, and a complicated process is required to manage the magnetic field intensity H. To avoid this problem, the integral loop used in computing the magnetic field intensity $H_z$ (i+½, j−½, k) is set as the integral loop ABCDEFA by adding the section ABEF to the plane BCDE. Since there are no such problems on the other section AFGH, it is processed as one plane.

On the other hand, the magnetic field intensity $H_z$ (i+½, j+½, k) can be similarly computed along the integral loop AFGHA. Also in the case shown in FIG. 3B, the integral loop used in computing the magnetic field intensity $H_z$ (i+½, j+½, k) is the integral loop BCDEFGB, and the integral loop used in computing the magnetic field intensity $H_z$ (i+½, j+3/2, k) is the integral loop ABGFHIA.

The magnetic field intensity H of the plane which is perpendicular to the plane containing the conductor, and contains the grid line (side) divided by the conductor is then computed. The computation is performed based on the field intensity E amended by the equations (10) through (14). For example, in the case shown in FIG. 3A, the magnetic field intensity $H_x$ (i, j+½, k+½) is computed by the following equation using the field intensity $E_y$ (i, j+AB/2$\Delta y$, k), and $E_y$ (i, j+1−AH/2$\Delta y$, k). Other magnetic field intensity $H_x$ (i, j+½, k+½), $H_x$ (i+1, j+½, k−½), and $H_x$ (i+1, j+½, k−½) can also be computed by a similar equation. In the case shown in FIG. 3B, the magnetic field intensity $H_x$ (i, j+½, k+½), $H_x$ (j+1, j+½, k−½), $H_y$ (i+½, j+2, k−½), and $H_y$ (i+½, j+1, k−½) can also be computed by a similar equation.

$$H_x^{n+\frac{1}{2}}\left(i, j+\frac{1}{2}, k+\frac{1}{2}\right) = H_x^{n-\frac{1}{2}}\left(i, j+\frac{1}{2}, k+\frac{1}{2}\right) - \quad (16)$$

$$K_{3x}\left(i, j+\frac{1}{2}, k+\frac{1}{2}\right) \times \left\{\left[E_z^n\left(i, j+1, k+\frac{1}{2}\right) - \right.\right.$$

$$\left.E_x^n\left(i, j, k+\frac{1}{2}\right)\right]\Delta z - E_y^n\left(i, j+\frac{1}{2}, k+1\right)\Delta y +$$

$$\left.E_y^n\left(i, j-\frac{1}{2}, k\right)AB + E_y^n\left(i, j+\frac{3}{2}, k\right)AH\right\}$$

A conductor crossing a grid line can be easily connected to a conductor approximated in a grid pattern. For example, in the case shown in FIG. 3A, if the side AH exists in the conductor, then the field intensity $E_y$ to be defined on the side AH is to be set to zero only. Thus, the object (structure) which is to be analyzed and exists in an analyzed space can be represented as a linear conductor.

As described above, for example, in the case shown in FIG. 3A, the integral loop ABCDEFA is used in the computation of the magnetic field intensity $H_z$ (i+½, j−½, k), and the field intensity $E_y$ on the side AB is defined as the field intensity $E_y$ on the side BC. Thus, although a plane is divided by a conductor into a plurality of sections, the increase in number of computed intensity can be avoided. That is, an object to be analyzed can be imitated as a line while avoiding the increase in necessary computation resources. In the aspect of the development of a program, since there is no necessity of newly preparing an array variable for substitution of the computed intensity, that is, since the computed intensity can be managed in the same method as the conventional technology, the program can be easily developed. When the present invention is applied to an existing analysis program, the necessary update can be easily carried out.

If the field intensity $E_y$ of the side BC is defined as the field intensity $E_y$ of the side AB, the field intensity $E_y$ of the side BC is processed as the field intensity $E_y$ obtained on the side AC. However, since the intermediate difference is used in the FDTD method, an error occurring in the process is possibly in a limited range. For the above mentioned reason, the magnetic field intensity H is computed as described above, and the field intensity E is defined as described above. If there is enough computer resources, the plane is divided by the conductor, and at least one of the field intensity and the magnetic field intensity is obtained for each of the divided sections.

The line representing a conductor is to be placed on the planes forming a cell. However, as compared with the case in which line is arranged on the grid lines, the places on which the line is arranged is changed from straight lines to a plane. Therefore, the restriction on the arrangement of the line is considerably moderated, thereby improving the flexibility. Thus, line other than straight line can be processed. As a result, high generality can be attained. Although the staircase approximation method is used, there is no necessity of arranging the line along the grid lines, thereby representing the shape with a smaller error without reducing the size of the cell.

Figure 4:
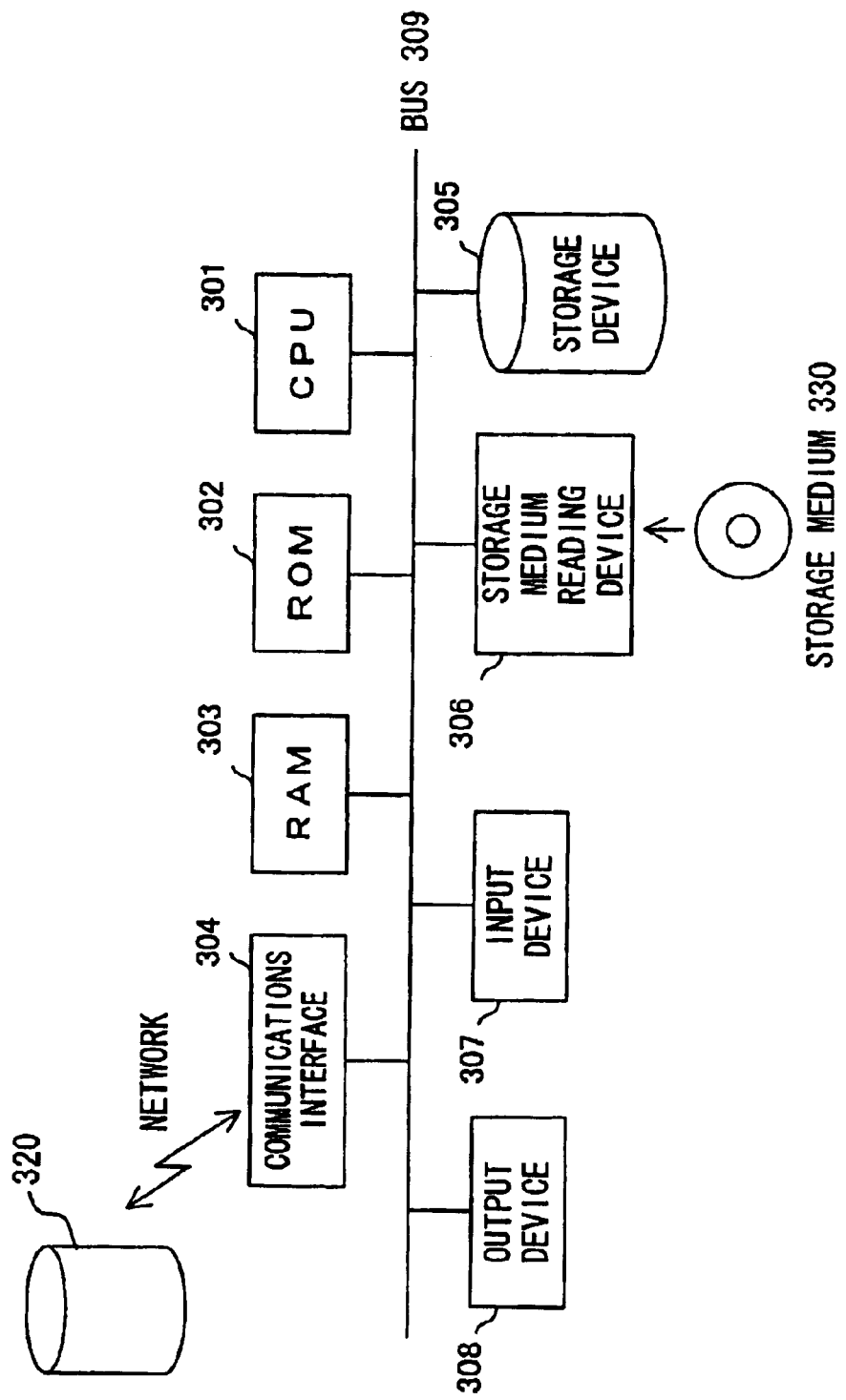
FIG. 4 shows the configuration of the circuit of the simulation device according to an embodiment of the present invention.

FIG. 4 shows the configuration of the circuit of the simulation device according to the present embodiment. The device imitates a conductor as described above, and, for example, performs a surge analysis.

The device is realized by directing a computer to execute an analysis program according to the present embodiment. As shown in FIG. 4, a CPU 301, ROM 302, RAM 303, a communications interface 304, a storage device 305, for example, a hard disk device, a storage medium reading device 306 for reading data, an input device 307 for indication using a keyboard, a pointing device, etc., and an output device 308 for outputting an image to a display device not shown in the attached drawings, for example, are interconnected through a bus 309.

The above mentioned analysis program is stored in the communications interface 305, the storage medium 330, or a storage medium 320 capable of accessing an external device. When the storage medium 320 stores an analysis program, the CPU 301 obtains the analysis program through the external device, a network, the communications interface 304, and the bus 309, and executes it.

Figure 5:
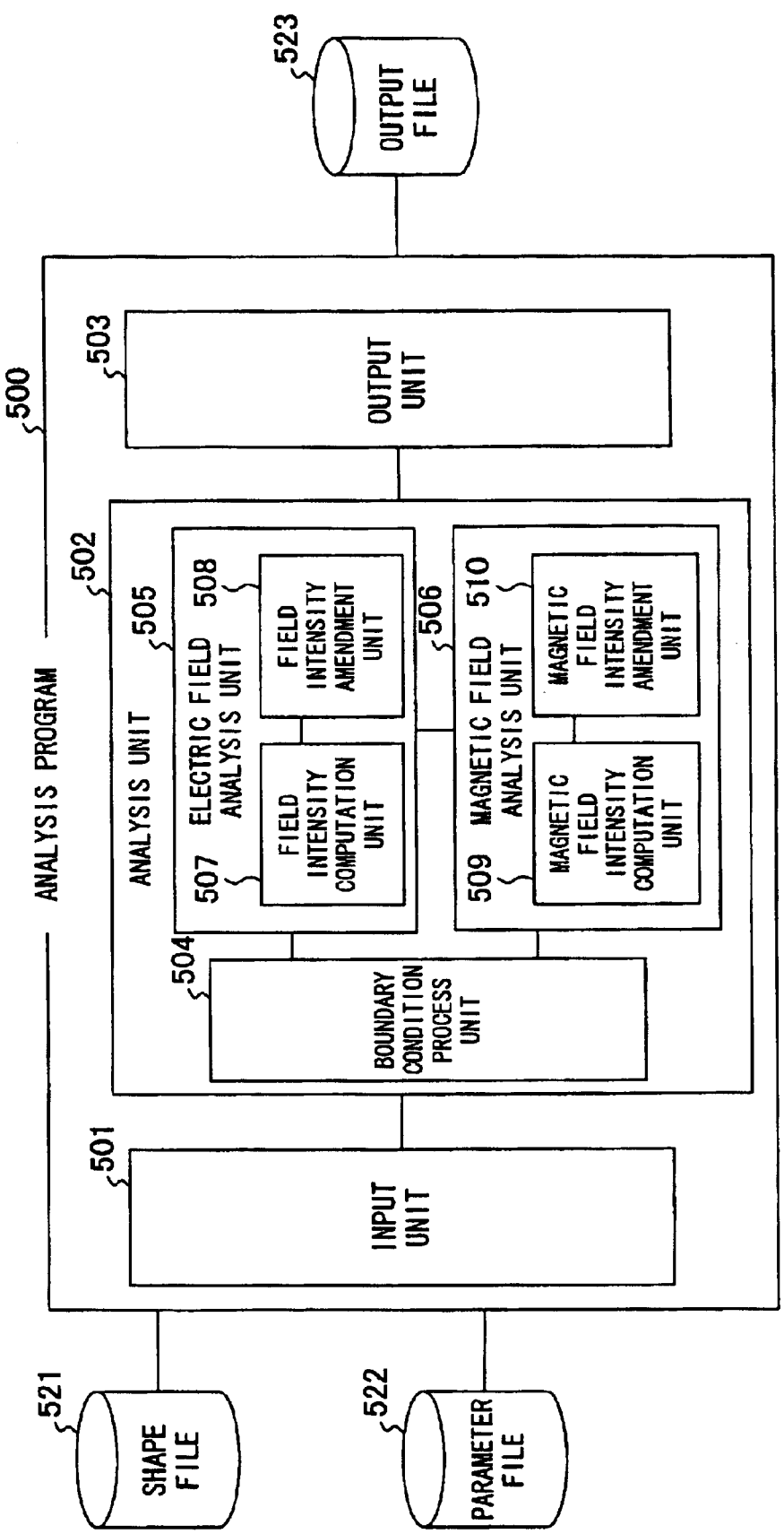
FIG. 5 shows the configuration of the function of an analysis program.

FIG. 5 shows the configuration of the function of the above mentioned analysis program.

A shape file 521 shown in FIG. 5 is a file storing setting data for the shape, the arrangement, etc. of an analyzed space or an object to be analyzed in the analyzed space, etc. The structure (medium) to be processed as a linear conductor is set in the shape file 521 by, for example, the data indicating the coordinates of the starting and terminating points. A parameter file 522 is a file storing a values of various parameters, etc. for an analysis. The settings for a voltage source, a boundary condition, etc. are obtained through the parameter file 522. An output file 523 is a file for output of an analysis result. The files 521 through 523 are specified by a user.

An analysis program 500 uses the shape file 521 and the parameter file 522 as input files, performs an electromagnetic field analysis (surge analysis) using the data stored therein, and the analysis result is output to the output file 523.

The configuration of the functions of an analysis program 500 is roughly formed by an input unit 501, an analysis unit 502, and an output unit 503. The input unit 501 mainly fetches the data stored in the shape file 521 and the parameter file 522, and provides the data for the analysis unit 502.

The analysis unit 502 comprises a boundary condition process unit 504, an electric field analysis unit 505, and a magnetic field analysis unit 506. The boundary condition process unit 504 provides set boundary conditions for the electric field analysis unit 505 and the magnetic field analysis unit 506. The electric field analysis unit 505 computes the field intensity E in the current time step using the field intensity E computed in the time step immediately before and the magnetic field intensity H computed by the magnetic field analysis unit 506. The other magnetic field analysis unit 506 computes the magnetic field intensity H in the current time step using the magnetic field intensity H computed in the time step immediately before and the field intensity E computed by the electric field analysis unit 505. The output unit 503 associates the intensity E and H obtained through the computation by the analysis units 505 and 506 with the time, and outputs the results to the output file 523.

The electric field analysis unit 505 comprises a field intensity computation unit 507 and a field intensity amendment unit 508. The field intensity computation unit 507 computes the field intensity E based on the assumption that no conductors cross the grid lines of the cell. The field intensity amendment unit 508 inputs the field intensity E computed by the field intensity computation unit 507, and amends the field intensity E of the plane on which a conductor crosses the grid lines as described above. The amendment is made after the computation of the field intensity E is completed because, on the plane on which the conductor crosses the grid lines (sides), the field intensity E of another plane is defined as the field intensity E of the grid lines. Therefore, it is necessary to avoid defining the field intensity E before updating the other plane. The field intensity E obtained after making the amendment is to be output to the output unit 503.

Like the electric field analysis unit 505, the magnetic field analysis unit 506 comprises the magnetic field intensity computation unit 509 and a magnetic field intensity amendment unit 510. A magnetic field intensity computation unit 509 computes the magnetic field intensity H based on the assumption that no conductors cross the grid lines of a cell. The magnetic field intensity amendment unit 510 input the magnetic field intensity H computed by the magnetic field intensity computation unit 509, and amends the magnetic field intensity H of the plane on which a conductor crosses the grid lines as described above. Likewise, the amendment is made after the computation of the magnetic field intensity H is completed. The magnetic field intensity H obtained after the amendment is output to the output unit 503.

Figure 6:
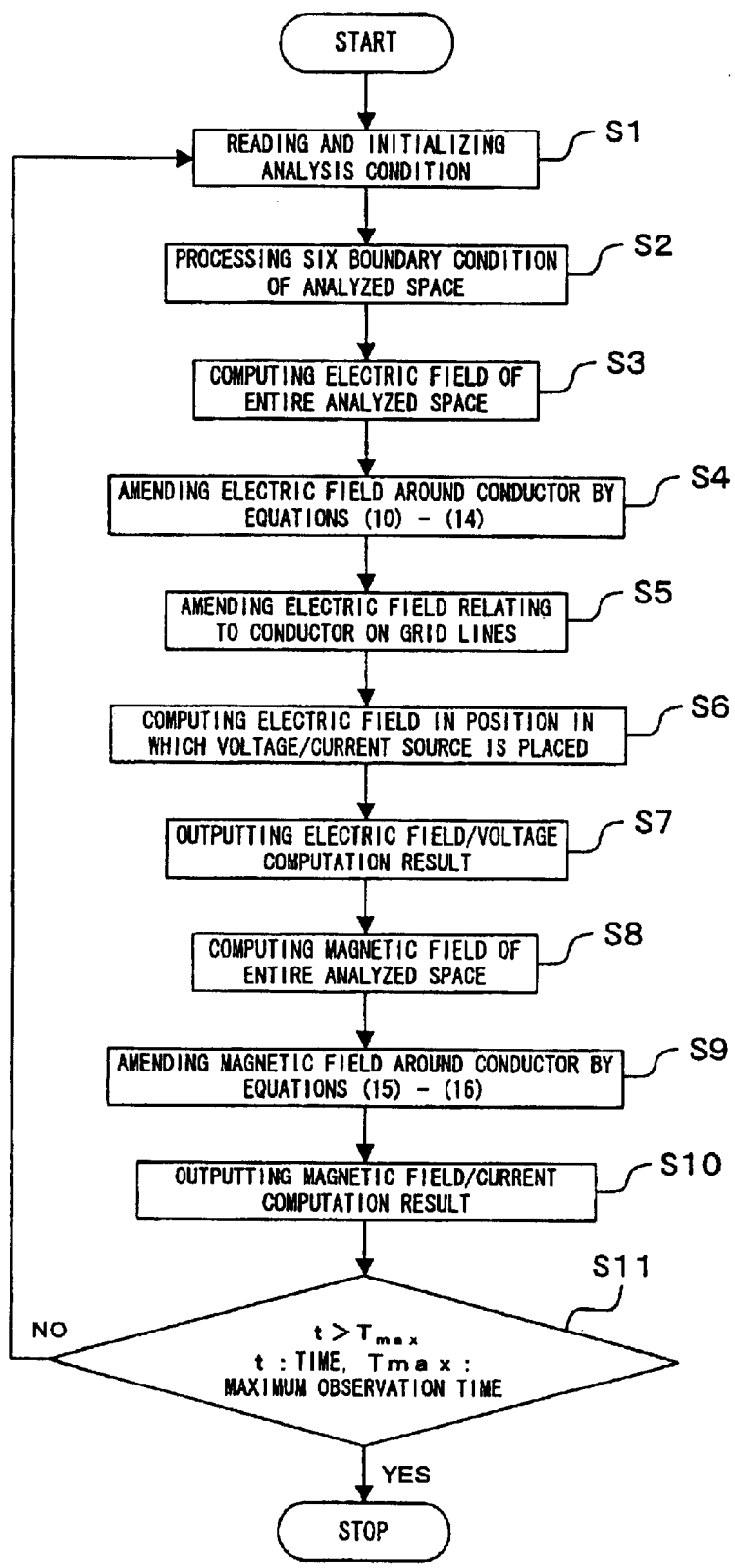
FIG. 6 is a flowchart of the electromagnetic field analyzing process.

The electromagnetic field analyzing (surge analysis) process realized by the CPU 301 executing the analysis program having the above mentioned configuration of the functions is described below in detail by referring to FIG. 6.

First, in step S1, the user specified data stored in the shape file 521 and the parameter file 522 are accessed, the analysis condition set in the files 521 and 522 are read, and the initialization is performed before performing the computation in the next time step. In the next step S2, the process of the boundary condition set for each of the six planes (surrounding planes) of an analyzed space is performed. Then, control is passed to step S3.

In step S3, the computation of the field intensity E is performed on the entire analyzed space. The computation is performed based on the assumption that no conductors cross the grid lines of a cell. In the subsequent step S4, the field intensity E around the conductor is amended as described above by referring to the equations (10) through (14). Then, in the subsequent step S5, the field intensity E of the conductor on the grid lines is amended, and the field intensity E on the grid lines in the conductor is set to zero. Then, control is passed to step S6.

In step S6, the field intensity E in the position of the electric supply unit such as a voltage supply, a current supply, etc. in the analyzed space is computed. In step S7, the computation results of the field intensity E, the voltage value, etc. obtained by performing the processes in steps S2 through S6 are output to the output file 523. Then, control is passed to step S8.

In step S8, the magnetic field intensity H is computed on the entire analyzed space. Then, in step S9, the magnetic field intensity H around the conductor is amended as described above by referring to the equations (15) and (16). In the next step S10, the computation results of the magnetic field intensity H, the current value, etc. obtained by performing steps S8 or S9 are output to the output file 523. Then, in step S11, it is determined whether or not the time t indicating the length of a time in which the analysis is performed is longer than the maximum observation time $T_{max}$. If the analysis for the predetermined maximum observation time $T_{max}$ is completed, the determination is YES, thereby terminating the electromagnetic field analyzing process. Otherwise, the determination is NO, and control is returned to step S1, the time steps is forwarded by one step, and the subsequent processes are similarly performed.

Described below is the analysis result obtained using the simulation device according to the present embodiment.

Figure 7:
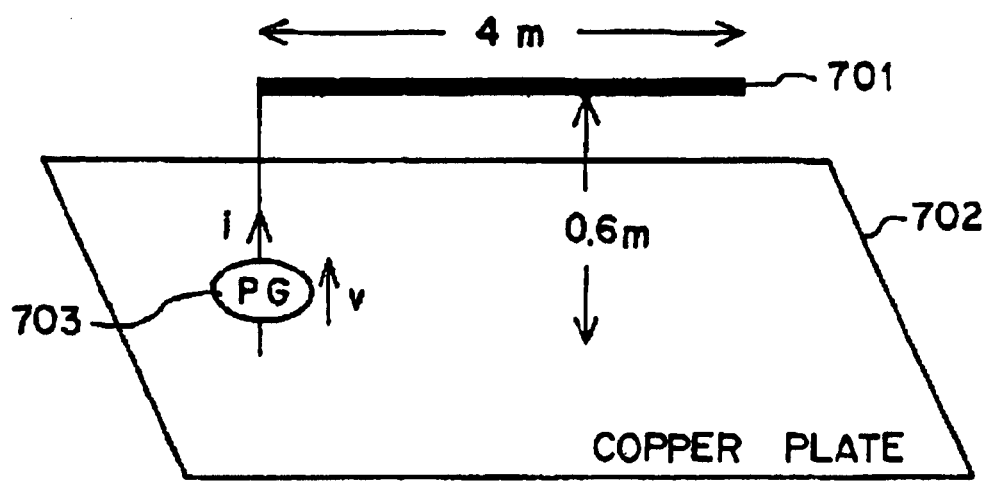
FIG. 7 shows the positional relationship about the conductors.

FIG. 7 shows the positional relationship of the conductors. It shows the conductors existing in an analyzed space and the positional relationship among the conductors.

In the analyzed space, a conductor 701 set horizontally on the ground is placed 0.6 m from a copper plate 702. The conductor 701 an aluminum pipe of 4 [m] in length and $15 \times 10^{-3}$ [m] in radius. A pulse generator (PG) 703 for which an electric charge is applied to the cable of the characteristic impedance of 50 ohm by the mercury relay is connected to the conductor 701.

Figure 8:
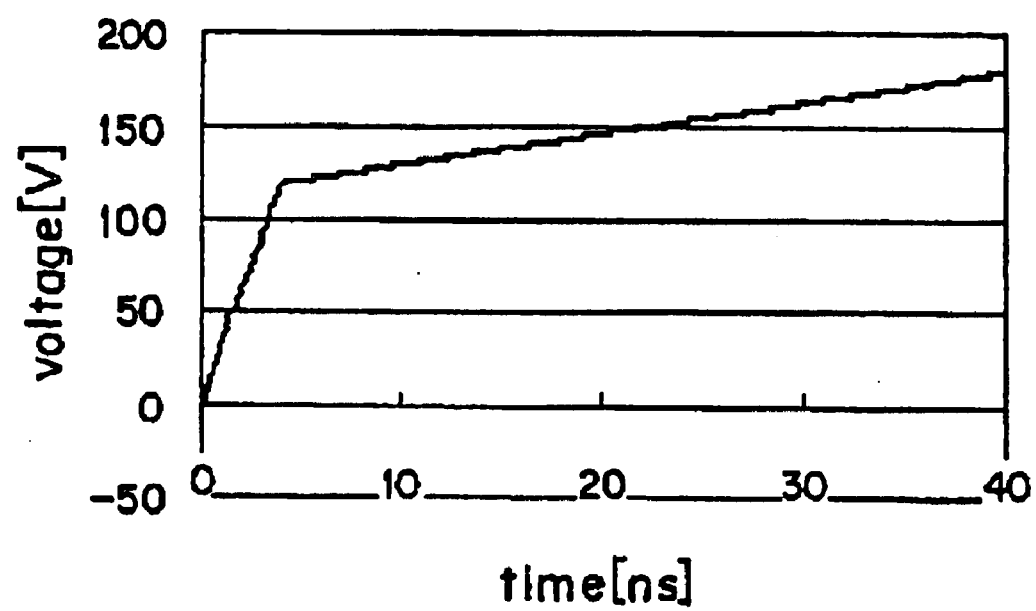
FIG. 8 shows the output voltage waveform of the pulse generator.

In the analyzed space having the above mentioned object to be analyzed, an analysis for obtaining a current/voltage waveform at the sending end when the voltage waveform as shown in FIG. 8 is applied from the pulse generator 703 to the conductor 701 is carried out as a verification analysis. The measurement result and the analysis result in the conventional method (hereinafter referred to as a conventional technology 1) in which the conductor 701 is arranged on the grid lines are obtained from the above mentioned conventional technology document 2. For comparison, an analysis is carried out by the conventional technology (hereinafter referred to as a conventional technology 2) in which the conductor 701 is not arranged on the grid lines, but is staircase-approximated.

In the computation in the FDTD method described in the conventional technology 2, the component in the direction of the conductor 701 defined in the position of the conductor 701 is set to zero, and the radius is not considered. Assuming that the length of one side of the cells into which an analyzed space is divided is Δs, the radius computed in the FDTD method is 0.2298 Δs [m].

The voltage waveform when the sending end is released is imitated as shown in FIG. 8, and the resistivity of the ground imitated by the copper plate 702 is $1.69 \times 10^{-8}$ ohm/m. The current sensor used in the experiment has the rise time of 2 ns. Thus, although a unit step current flows, the response indicates a first-order delay represented by the following equation.

$$s(t) = 1 - \exp\left(-\frac{t}{2 \times 10^{-9}}\right) \quad (17)$$

When the equation (17) is differentiated, the unit impulse response h(t) is represented by the following equation.

$$h(t) = \frac{\exp\left(-\frac{t}{2 \times 10^{-9}}\right)}{2 \times 10^{-9}} \quad (18)$$

Figure 10A:
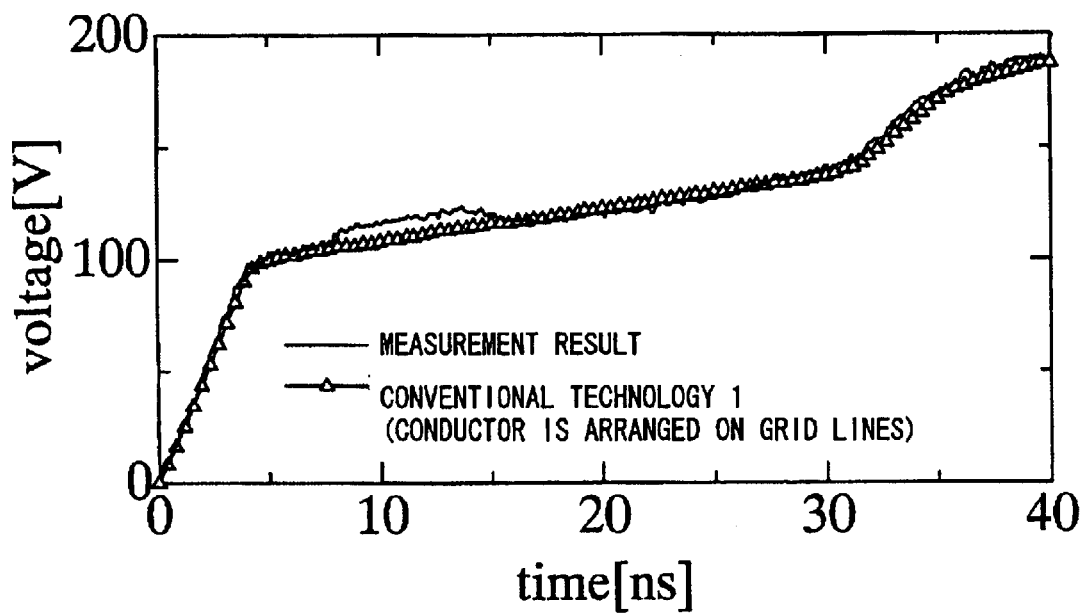
FIG. 10A shows the analysis result (voltage waveform at the sending end) according to the conventional technology 1.
Figure 10B:
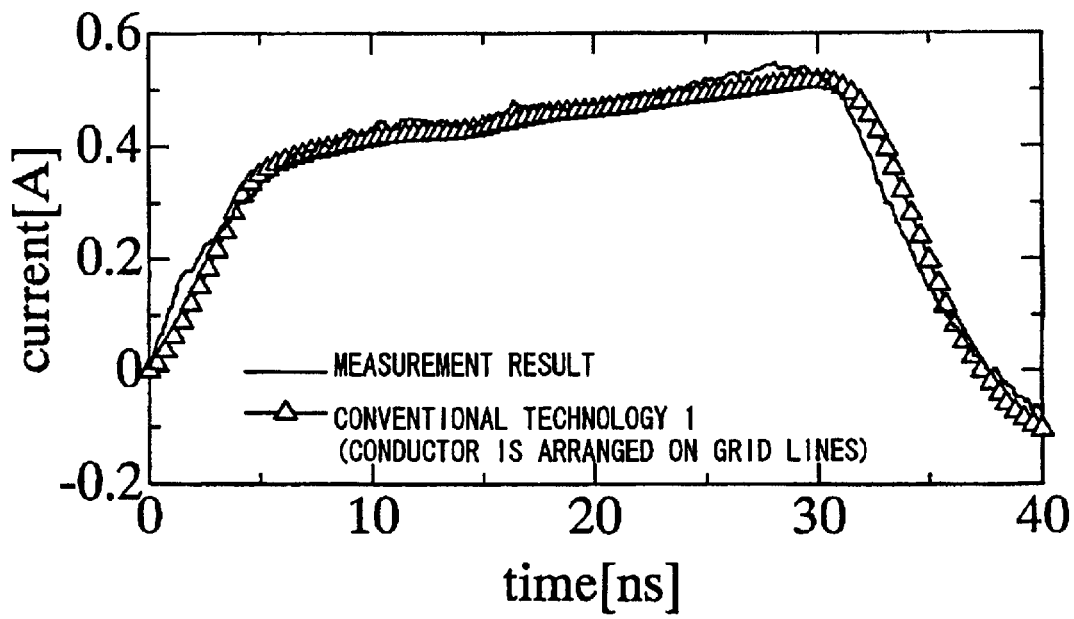
FIG. 10B shows the analysis result (current waveform at the sending end) according to the conventional technology 1.

Therefore, when the observed waveform is compared with the computation result obtained in the FDTD method, the following convolutional operation is performed on the measurement result. FIGS. 9A and 9B show the analysis results according to the present embodiment in comparison with the measurement result obtained by the operation. Similarly, FIGS. 10A and 10B show the analysis results obtained in the conventional technology 1 in comparison with the measurement result, and FIGS. 11A and 11B show the analysis results obtained in the conventional technology 2 in comparison with the measurement result.

$$i_o = h(t) * i(t) \quad (19)$$

As clearly shown in FIGS. 9A through 11B, the conventional technology 1 in which the conductor 701 is arranged on the grid lines can obtain high precision analysis result as compared with the conventional technology 2 in which the conductor 701 is processed in the staircase approximation method. The analysis result according to the present embodiment matches the measurement result with the same as or higher precision than the conventional technology 1. Thus, when the present invention is applied to the electromagnetic field analysis, high precision not obtained in the conventional technology can be attained without arranging the grid lines.

According to the present embodiment, a linear line is used as a line representing a conductor, but a curve can be used. An object to be represented is not limited to a conductor, a structure, etc., but can be optionally selected from among media existing in the analyzed space. The approximation method used on the field intensity E around the crossing of the conductor is not limited to the present embodiment, but can be used in various embodiments.

As described above, the present invention sets (represents) as a line a medium (for example, a conductor, a structure, etc.) selected from among the media existing in the analyzed space, and a plane in which the line crosses a plurality of sides in the planes forming a cell is divided into a plurality of sections, and at least the field intensity and the magnetic field intensity is obtained.

By dividing a plane by the line into a plurality of sections and obtaining at least one of the field intensity and the magnetic field intensity, the line is processed as arranged on the side of the cell. Since the line is to be arranged on the plane of the cell, high flexibility is attained, and the generality can be improved. Attaining high flexibility enables the shape of the medium represented by the line to be correctly imitated. Thus, the high generality can be attained with the electromagnetic field analysis carried out with high precision and reliability.

In the above mentioned division of the plane by the line, if a section not containing the position in which the magnetic field intensity is computed in a plurality of sections obtained by dividing the plane by the line is included as an adjacent plane, and a section containing the position is not included as an adjacent plane, then increase in the number of planes by the division can be avoided. As a result, the number of the finally obtained intensity, that is, the increase in the amount of data to be stored as an analysis result can be avoided, thereby suppressing the increase in the necessary computer resources.

What is claimed is:

1. An electromagnetic field analysis method based on an FDTD (Finite Difference Time Domain) method for carrying out an electromagnetic field analysis using the FDTD method by dividing an analyzed space into hexahedral cells, comprising:

setting a medium selected from among a plurality of media existing in the analyzed space to be divided into cells as a line; and dividing a plane in which the line crosses a plurality of sides in the planes forming the cell by the line into plural units, thereby obtaining field intensity or magnetic field intensity.

2. The method according to claim 1, wherein in said division of the plane by the line, a section not containing a position in which the magnetic field intensity is computed in a plurality of sections obtained by dividing the plane by the line is included as an adjacent plane, and a section containing the position is not included as an adjacent plane.

3. The method according to claim 1, wherein at least one of the field intensity of the plurality of the sections obtained by dividing the plane by the line as field intensity having the same direction computed on a periphery of the plane.

4. The method according to claim 1 or 3, wherein said magnetic field intensity of the plane divided into a plurality of sections by the line is computed using plural values of field intensity obtained using an integral loop including the line.

5. The method according to claim 2, wherein said magnetic field intensity of each plane which is adjacent in a crossing direction to the plane divided by a line into a plurality of sections and has a side crossing the line is computed based on a plurality of adjacent sections.

6. The method according to claim 1 or 3, wherein each field intensity of the plane divided by the line into a plurality of sections is computed without considering the line, and then one or more of the computed field intensity is to be amended as necessary.

7. A medium representing method in an electromagnetic field analysis for representing a medium by the electromagnetic field analysis carried out in the FDTD Finite Difference Time Domain) method by dividing an analyzed space into hexahedron cells, comprising:

selecting a medium existing in the analyzed space to be divided into cells; and setting and representing the selected medium as a line crossing a plurality of sides of a plane forming part of a cell.

8. A simulation device which divides an analyzed space into hexahedron cells, and carries out an electromagnetic field analysis in an FDTD (Finite Difference Time Domain) method, comprising:

a medium setting unit setting a medium existing in the analyzed space as a line; and an analysis unit obtaining field intensity or magnetic field intensity by dividing a plane crossing a plurality of sides in the planes of the cell obtained by dividing the analyzed space by the line set by said medium setting unit.

9. The device according to claim 8, wherein a section not containing a position in which the magnetic field intensity is computed in a plurality of sections obtained by dividing the plane by the line is included as an adjacent plane, and a section containing the position is not included as an adjacent plane.

10. The device according to claim 8, wherein said analysis unit adopts the field intensity having the same direction computed on the periphery of the plane as at least one of the field intensity of the plurality of the sections obtained by dividing the plane by the line.

11. A computer-readable storage medium storing a program used to direct a computer used as a simulation device for performing an electromagnetic field analysis in an FDTD (Finite Difference Time Domain) method by dividing an analyzed space into hexahedron cells, comprising:

a function of setting a medium existing in the analyzed space as a line; and a function of obtaining field intensity or magnetic field intensity by dividing a plane crossing a plurality of sides in the planes of the cell obtained by dividing the analyzed space by the line set by said setting function.

* * * * *